Aug. 27, 1946.  W. V. THELANDER ET AL  2,406,414
DOUBLE CLUTCH
Filed May 31, 1944   2 Sheets-Sheet 2

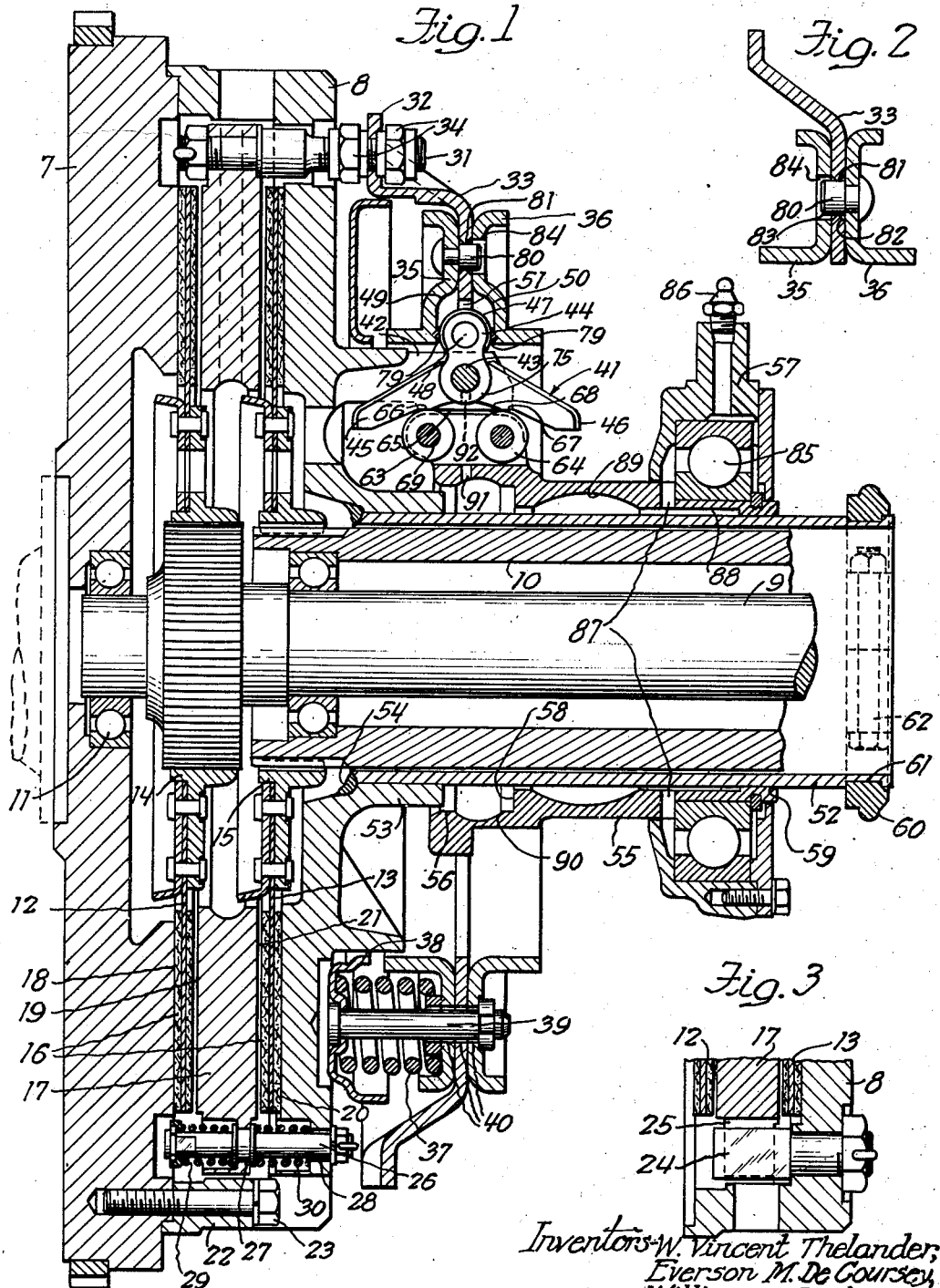

Inventors:
W. Vincent Thelander,
Everson M. DeCoursey,
William O. Bechman
& William W. Henning Patented Aug. 27, 1946

2,406,414

UNITED STATES PATENT OFFICE 2,406,414

DOUBLE CLUTCH

W. Vincent Thelander and Everson M. De Coursey, Auburn, Ind., and William O. Bechman, Chicago, Ill., and William W. Henning, River Grove, Ill., assignors to The Atwood Vacuum Machine Company, Rockford, Ill., a copartnership composed of Seth B. Atwood and James T. Atwood Application May 31, 1944, Serial No. 538,156

21 Claims. (Cl. 192—68)

This invention relates to friction clutches, and is more particularly concerned with improvements in two-way clutches of the kind disclosed in the co-pending application of Kay Miller, Serial No. 461,960, filed October 14, 1942, such clutches being especially intended for use with a two-rate transmission in a tractor, tank, truck, or the like, and being suitable for other uses.

One of the principal objects of our invention is to provide an improved actuating mechanism for a double or two-way clutch, in which the actuating sleeve carries roller means on the forward end thereof to cooperate with the cam levers for actuating the clutch, which are pivotally mounted on the back plate, the said roller means also cooperating with guide track surfaces provided therefor on the back plate and accurately machined with respect to the axis of rotation of the clutch, whereby the sleeve is maintained in accurately centered relation to the rest of the clutch and at the same time keyed to turn with the back plate in all positions of adjustment, and the roller means serves the double purpose of transmitting movement to the clutch actuating levers with minimum friction and provides roller bearing support for the front end portion of the sleeve to further insure smooth and easy operation, in addition to eliminating likelihood of vibration due to an out-of-center condition that might otherwise be produced. In accordance with our invention, the actuating sleeve is of bell-mouthed construction having a bearing surface therein only in the rear end portion for slidable support on a tubular guide provided therefor, projecting rearwardly from the center of the back plate, the sleeve relying for its bearing support at the front end upon the roller means, as just stated, thus reducing friction losses in the operation of the clutch to a minimum, and making for easy operation.

Another object of our invention is to provide a clutch of the kind mentioned, embodying improved lubrication facilities for the clutch actuating mechanism, in which the aforesaid sleeve carrying the roller means serves to conduct lubricant in the required amount to the roller means and cam levers and their bearings from the throw-out collar mounted on the rear end of the sleeve, the roller means in turn spreading the lubricant onto the cam levers and the guide track surfaces on the back plate to insure easy operation and reduce wear to a minimum. The sleeve is moreover specially formed on the inner side in accordance with our invention, to provide an annular pocket intermediate the ends thereof to retain by centrifugal force the bulk of the lubricant that has found its way from the throw-out bearing into the sleeve, so as not to have too much lubricant dispensed to the roller means at any one time.

The invention is illustrated in the accompanying drawings, in which—

Figure 1 is a longitudinal section through a double clutch, made in accordance with our invention;

Figs. 2 and 3 are sectional details on the correspondingly numbered lines of Fig. 4;

Similar reference numerals are applied to corresponding parts throughout the views.

Figure 4:
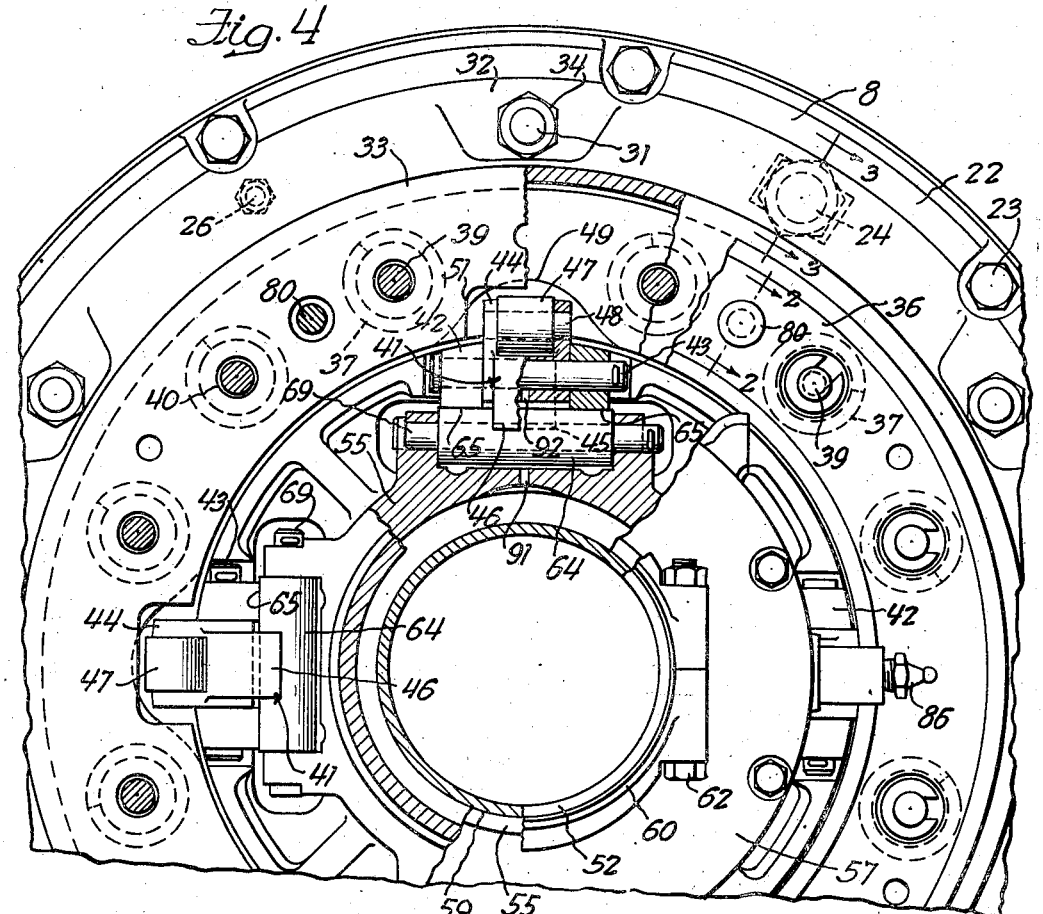
Fig. 4 is a fragmentary view of the clutch of Fig. 1, partly in rear elevation and partly in transverse section.

Referring first mainly to Figs. 1 and 4, the reference numeral 7 designates the fly-wheel of an engine and 8 the back plate thereon. 9 is the driven shaft extending rearwardly from the flywheel adpted for direct connection with the propeller shaft or to be extended into the front end of the gear box of a transmission, and 10 is a quill surrounding the shaft and serving as an auxiliary driven member, one of the members 9 and 10 being, for example, for high ratio drive and the other for low ratio drive. The shaft 9 has the usual pilot bearing 11 supporting the front end thereof at the center of the flywheel. There are two clutch disks 12 and 13, the disk 12 having its center hub 14 splined on the front end of the shaft 9 to transmit drive from the flywheel to the shaft when the disk 12 is engaged, and the disk 13 having its hub 15 splined on the front end of the quill 10 to transmit drive from the flywheel to the quill when the disk 13 is engaged. 16 designates the usual pads or facings on the clutch disks, and a pressure plate 17 is disposed between these disks, adapted when moved forwardly to engage disk 12 with the driving face 18 on the back of the flywheel and the companion driving face 19 on the front of the pressure plate. The pressure plate is also movable rearwardly for engagement with disk 13 to cause engagement thereof with the driving face 20 on the inner side of the back plate 8 and the companion driving face 21 on the back of the pressure plate. The surfaces 18—21 are, of course, all accurately machined on these cast parts to insure smooth clutch engagement. The back plate is bolted to the flywheel by means of its marginal flange portion 22, as indicated at 23. The pressure plate 17 has sliding driving connections with the back plate 8 at circumferentially spaced points around the periphery thereof by means of studs 24 fixed on the back plate and having the flat side surfaces thereof slidably engaging the flat side surfaces of notches 25 cut in the periphery of the pressure plate. These studs 24 will, of course, transmit drive to the pressure plate in both of its engaged positions, and also turn the pressure plate with the flywheel in the neutral position of said plate. Pins 26 are slidably mounted in holes 27 provided in the pressure plate and registering holes 28 provided in the back plate at circumferentially spaced points. Coiled compression springs 29 and 30 are held caged on each of the pins 26 on opposite sides of the pressure plate and tend to hold the pressure plate in the neutral position illustrated. That is to say, the springs 29 act between the pins 26 and the pressure plate tending to resist movement of the pressure plate toward the clutch disk 12, whereas the springs 30 acting between the back plate and the pressure plate tend to resist movement of the pressure plate toward the clutch disk 13, and these opposing springs are in balanced equilibrium when the pressure plate is in the neutral position.

The pressure plate 17 has studs 31 mounted on the rim portion thereof in circumferentially spaced relation, and these studs are adjustably secured to the peripheral flange 32 of a cupped sheet metal ring 33 by nuts 34 threaded on said studs. Two other sheet metal rings 35 and 36 are disposed on opposite sides of the radially inner portion of the ring 33 and are urged toward one another by a single series of coiled compression springs 37 disposed in circumferentially spaced relation with respect to the ring 35, between the ring 35 and a retaining ring 38. Pins 39 slidable in registering holes 40 in the rings 33, 35, and 36 extend through the springs 37 and through holes in the retainer ring 38 and hold the parts together with the springs 37 caged under a predetermined compression, known as a "pre-load" pressure, so that when the pressure plate is held engaged under additional compression of the springs 37, the clutch is engaged under a desired increased spring pressure above the "pre-load" pressure.

A single series of clutch actuating levers 41 is provided in accordance with the Kay Miller application above identified, operating between the rings 35 and 36 to move the pressure plate 17 selectively in either direction and hold it engaged under pressure of the springs 37. The levers 41 are disposed in circumferentially spaced relation relative to the back plate 8, each being mounted between a pair of lugs 42 cast integral with the back plate, the lugs carrying a cross-pin 43 for pivotal support of the lever 41. Each of the levers 41 has three arms, 44, 45, and 46. The arm 44 is forked and has a roller 47 rotatably mounted therein on a cross-pin 48, the roller being received in arcuate recesses 49 and 50 struck radially in the inner marginal edge portions of the rings 35 and 36, respectively. The ring 33 is cut away, as indicated at 51, for reception of the arm 44 and roller 47, so that the lever 41 is free to oscillate in either direction with respect to the ring 33 for actuation of the clutch. When the lever 41 is oscillated in a clockwise direction from the position shown in Fig. 1, the initial movement causes movement of the pressure plate 17 and the three rings 33, 35, and 36 as a unitary assembly until the clutch disk 13 is packed between the surfaces 20 and 21, after which the further movement of the lever 41 causes movement of the ring 36 away from the ring 33, thereby compressing the springs 37 and transmitting this increased spring pressure through the ring 33 to the pressure plate so as to hold the clutch disk 13 engaged under heavy spring pressure. When the lever 41 is oscillated in a counterclockwise direction from the position shown in Fig. 1, the pressure plate 17 is moved toward the clutch disk 12, and after the clutch disk is packed between the surfaces 18 and 19, the ring 35 in the further movement of the lever 41 is moved away from the ring 33, thereby compressing the springs 37 so that increased spring pressure is transmitted through the ring 33 to the pressure plate to keep the clutch disk 12 engaged under heavy spring pressure. The rings 35 and 36 are both stamped to channel-shaped cross-section, as indicated, and the same is true of the retainer ring 38, whereby to reinforce these rings and make for maximum strength and rigidity with an otherwise relatively light sheet metal construction.

No invention is claimed herein in the construction thus far described, excepting only insofar as the details thereof cooperate with and form a part of novel combinations with the improvements hereinafter described.

A tubular guide 52 is welded in the center hub 53 on the back plate, as indicated at 54, and projects rearwardly therefrom, surrounding the quill 10. It supports for reciprocation a sleeve 55, which is of bell-mouth form, as indicated at 56, to pass loosely over the hub portion 53 of the back plate when the sleeve 55 is moved forwardly by the throw-out collar 57. An annular internal shoulder 58 in the mouth portion of the sleeve limits forward movement thereof by abutment with the back of the hub 53. The sleeve has an annular bearing surface 59 in the rear end portion thereof for a close working fit on the guide 52, and rearward movement of the sleeve is limited by abutment of its bearing end 59 with a split ring 60 that is mounted in an annular groove 61 in the rear end portion of the guide. The halves of the split ring are fastened together by bolts 62. The front end of the sleeve is both keyed and guided on the back plate 8 by spaced elongated rollers 63 and 64 carried on the front end of the sleeve, and having close rolling contact on flat guide track surfaces 65, accurately machined on the radially inner sides of the lugs 42. It is this feature that makes the provision of only a single bearing 59 in the rear end portion of the sleeve 55 feasible and practical, and the rollers 63—64 cooperating with the track surfaces 65, not only provide anti-friction bearing support for the front end of the sleeve to permit its easy movement with the throw-out collar 57 but serve also to positively turn the sleeve with the back plate in all positions of reciprocatory adjustment of the sleeve. The close accuracy in the guiding of the sleeve 55 with respect to the back plate so as to maintain absolute concentricity under all operating conditions, means the elimination of vibration which might otherwise be excessive at higher speeds, and smoother all-around performance is obtained without having to work to extremely close tolerances. Furthermore, the rollers 63—64, in line with the disclosure of the Kay Miller application, cooperate with the arms 45 and 46 of the clutch actuating levers 41, respectively, to oscillate the levers in a clockwise direction upon forward movement of the throw-out collar and in a counterclockwise direction upon rearward movement thereof. Inasmuch as the movement of the sleeve 55 is limited by the hub 53 and ring 60, in the manner stated, the springs 37 can therefore be subjected only to a predetermined degree of compression. Each of the levers 41 is formed, as disclosed in the Kay Miller application, so that the arms 45 and 46 extend inwardly in diverging relation, and flats 66 and 67 are provided in the crotch portion of the lever between the arms 45 and 46 for engagement with the rollers 63 and 64 in the neutral position of the lever, whereby positively to hold the lever in neutral position while permitting a certain amount of free movement of the throw-out collar 57 in the neutral zone. The crotch portion is cut away, as indicated at 68, between the flats 66 and 67 for clearance purposes, the roller 64 being received in this cut-out portion when the throw-out collar is moved forward for engagement of the clutch disk 13, and the roller 63 being received in this cut-out portion when the throw-out collar is moved to the rear for engagement of the clutch disk 12.

In operation, the clutch is used in conjunction usually with a two-rate transmission. The shaft 9 may be connected either directly through a universal joint with the propeller shaft of the tractor, truck, tank, or other vehicle, or extended into the front end of the gear box of a change-speed transmission providing any desired number of speeds for forward and reverse drive. The quill 10 for the low ratio drive has a reduction gearing connection with the shaft 9, and when the disk 12 on the shaft 9 is engaged, the quill 10 and disk 13 are driven idly through said reduction gearing connection. On the other hand, when the clutch disk 13 is engaged for the low ratio drive, the disk 12 and shaft 9 are driven idly by reason of the reduction gearing connection mentioned. Forward movement of the throw-out collar 57 by means of a manually operable clutch pedal or lever (not shown) causes engagement of the disk 13 in the manner previously described. When the throw-out collar is moved rearwardly, the disk 12 is engaged in the manner previously described. The springs 37 in addition to providing resilient engagement so that close adjustment of the clutch is not required provide substantially constant pressure and, accordingly, non-slipping engagement regardless of the usual wear on the clutch facings 16. When the throw-out collar 57 is in the neutral position shown in Fig. 1, the springs 29 and 30 keep the pressure plate 17 in a mid-position out of engagement with both disks, while the rollers 63 and 64 by engagement with the flats 66 and 67 on the levers 41 positively hold said levers in neutral position so that there is no likelihood of accidental engagement of the clutch. On the other hand, when the clutch is engaged, using either of the disks 12 and 13, it is locked up in such condition by the levers 41 under pressure of the springs 37, thus insuring positive engagement of the clutch.

In Fig. 1, the rollers 63 and 64 are one-piece elongated rollers mounted on pins 69. Each of these rollers may, however, be in the form of a roller means made up of a number of rollers, as shown at 64a, 64b, and 64c in Fig. 5, these three rollers taking the place of a single roller and being preferably, though not necessarily, of the same diameter and mounted preferably on a single through pin 69a, the middle rollers 64b of the two spaced roller means, cooperating with each clutch actuating lever 41, being arranged to cooperate with the arms 45 and 46 of said lever, and the outer rollers 64a and 64c of each pair of rollers means having rolling contact on the guide track surfaces 65, both to guide the shiftable sleeve 55 relative to the back plate 8, and key said sleeve to said back plate to turn therewith as a unit, substantially in the same way and with the same ends in view as in the construction of Figs. 1 and 4. This construction of Fig. 5 offers the advantage of outboard bearings 70 for support of the pins 69a, and intermediate bearings 71 for said pins between the rollers 64a, 64b, and 64c, and obviously, since there are bearings 70 and 71 on opposite sides of each of the rollers 64a and 64c running on the track surfaces 65, the unit bearing load is extremely low, and there is accordingly less likelihood of any deflection of the supporting pins 69a under load, and therefore smoother and easier operation is obtained.

Figure 5:
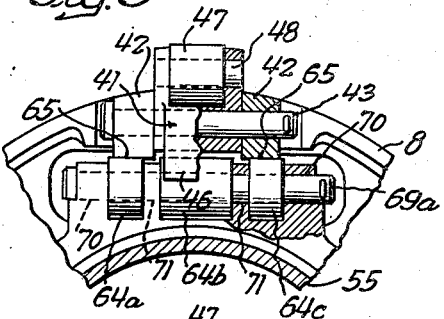
Figs. 5, 6, and 7 are sectional details illustrating modified or alternative constructions.
Figure 7:
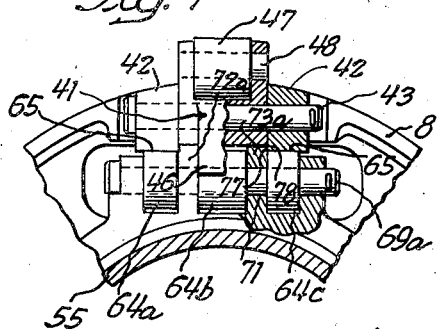

The construction shown in Fig. 7 is closely similar to that of Fig. 5, but in this construction the lugs 72a, in which the intermediate bearings 71 are provided, have key projections 73a, the outer faces 77 of which are accurately machined to have a close sliding fit on the inner side faces 78 of the lugs 42 adjacent the point where the rollers 64a and 64c run on the track surfaces 65. Here again, the unit bearing load is low because the rollers assume that portion of the load going with the guiding function only, and the key projections 73a assume that portion of the load going with the keying function.

Figure 6:
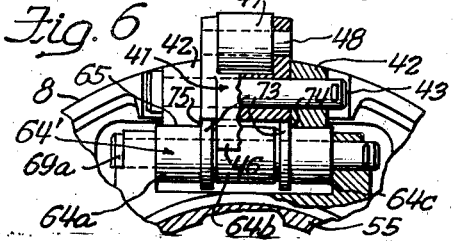

The construction shown in Fig. 6 is still another variation, closely similar to that of Fig. 4, because one-piece elongated rollers, similar to the rollers 63 and 64, are provided on the pins 69a, as indicated at 64'. The end portions 64a and 64c of these one-piece rollers run on the track surfaces 65, and the middle portions 64b operate the clutch actuating levers 41 by cooperation with the arms 45 and 46 thereof. These one-piece rollers, however, have annular flanges 73 on opposite sides of the middle portions 64b arranged to bear on their outer faces against the inner faces 74 and 75 of the lugs 42 adjacent the point where the end portions of these one-piece rollers run on the track surfaces 65, whereby at least a portion of the keying function is assumed by the flanges 73, leaving the guiding function to the end portions 64a and 64c of the rollers and the operation of the levers 41 to the middle portion 64b of the rollers, and thus secure a low unit bearing load.

Referring briefly to Fig. 1 again, attention is called to the embossed pad portions 79 where the rollers 47 of the clutch actuating levers 41 have rolling bearing contact in the recesses 49 and 50 of the rings 35 and 36. These pad portions 79 are of hard wear-resisting metal, such as stellite or toolweld, welded onto the sheet metal rings and accurately ground to provide smooth flat track surfaces parallel to one another on opposite sides of each of the rollers 47, in accurately spaced relation to one another and to the roller cooperating therewith, whereby to obtain the desired smooth and quiet operation, the hard wear-resisting material of these pad portions making for reduced wear and long life.

In Fig. 2 we have shown one of two cylindrical studs 80 the are riveted to the ring 36 at circumferentially spaced points 180° apart, and are arranged to have close sliding guiding contact in holes 81 provided therefor in the ring 33, whereby to relieve the bolts 39 of the guiding function and permit making the holes 40 in the rings 33, 35, and 36 slightly over-size, as appears in Fig. 1. The holes 81 are chamfered, as indicated at 82, and the studs 80 are beveled on the ends, as indicated at 83, to insure easy entry in the holes 81 when the ring 36 returns to the position shown, from an extreme position. The chamfering also reduces the area of frictional engagement and makes for easier operation and less likelihood of binding. There are holes 84 in the other ring 35, registering with the holes 81 to receive the ends of the studs 80 when the clutch is in neutral, and the rings 35 and 36 are accordingly in engagement with opposite sides of the ring 33. Two similar studs 80 are preferably mounted on the ring 35, 180° apart, and one of these appears in Fig. 1, to guide the ring 35 with respect to the ring 33, and there are holes 84 in the ring 36 in register with the holes 81 that receive these studs.

The throw-out collar 57 has lubricant supplied to its bearing 85 in any suitable manner, as, for example, through a pressure lubricator nipple 86, and in accordance with the present invention, provision is made for conducting some of this lubricant through the sleeve 55 to the roller means 63—64, or the roller means of Figs. 5, 6, and 7, as the case may be, and the clutch actuating levers 41, whereby to adequately lubricate the clutch actuating mechanism and thereby obtain smoother and easier operation and reduce wear to a minimum. A plurality of radial holes 87 are provided in the rear end portion of the sleeve 55 to establish communication between the inside of the throw-out collar 57 and the bore 88 of the sleeve 55, so that a certain amount of lubricant will find its way into the sleeve 55 whenever lubricant is injected into the throw-out collar, and in between such times, it being well known that the lubricant that is semi-fluid normally flows more readily with temperature rise, and, therefore, after each running of the tractor or other vehicle on which the clutch is installed, a certain amount of lubricant which during the running of the engine cannot enter the sleeve 55 due to centrifugal force, will find its way at least in some small amount into the sleeve 55 through a few of the holes 87, of which there are preferably six, in equally circumferentially spaced relation.

An annular pocket 89 is provided in the sleeve 55 intermediate the ends of the bore 88, and is intended to retain the bulk of the lubricant in the sleeve 55 and not allow it to be thrown outwardly to the clutch actuating mechanism under centrifugal force, the centrifugal force being relied upon to keep it in the pocket 89. It is only when the engine is stopped momentarily that some of the lubricant in a fluid or semi-fluid condition will, in collecting in the lower side of the sleeve, overflow the trough defined by the pocket 89, and thus find its way into the annular groove 90 in the forward or bell-mouth end of the sleeve. This lubricant in the groove 90 will be thrown outwardly under centrifugal force through radial holes 91 onto the rollers 63 and 64, or whatever other roller means may be provided, as in Figs. 5, 6, and 7, and onto the clutch actuating levers 41, the latter having holes 92 in the hub portions 75 thereof, extending radially inwardly in alignment with the holes 91 in the sleeve 55 so as to insure good lubrication of the pins 43 supporting said levers. A certain amount of lubricant will flow over the levers 41 outwardly under centrifugal force and onto the rollers 47, so as to lubricate the track surfaces on the pads 79. The rollers 63 and 64, or whatever roller means may be provided, will, of course, also thoroughly lubricate the flats 66 and 67 and the other surfaces on the arms 45 and 46 contacted by said rollers, and it is apparent, therefore, that good lubrication is obtained without the use of too much lubricant or more than could be expected to be derived from the throw-out collar.

It is believed the foregoing description conveys a good understanding of all of the objects and advantages of our invention. The appended claims have been drawn with a view to covering all legitimate modifications and adaptations.

We claim:

1. In a clutch actuating mechanism, the combination with a back plate, and a clutch actuating lever having a pair of divergent arms oscillatably mounted on the back plate, of a shiftable member adapted to reciprocate in substantially coaxial relation to the back plate, two spaced parallel roller means on said shiftable member in transverse relation to the axis of rotation of the clutch having rolling contact with said arms in the reciprocatory movement of said shiftable member to oscillate said lever in either direction, and guide means on the back plate having track surfaces thereon for rolling guiding contact of said roller means thereon to guide said shiftable member in coaxial relation to the back plate and assume the radial thrust on said shiftable member incident to the operation of the lever thereby.

2. A clutch as set forth in claim 1, wherein each roller means comprises an elongated roller, one portion of which is arranged to engage and operate said lever, and another portion of which is arranged to engage a track surface on said guide means.

3. A clutch as set forth in claim 1, wherein each roller means comprises a plurality of rollers coaxially mounted for rotation, one of which is arranged for operative engagement with said lever, and another of which is arranged for engagement with a track surface on said guide means.

4. A clutch as set forth in claim 1, wherein each roller means comprises an elongated roller, a middle portion of which is arranged to engage and operate said lever, and the end portions of which are arranged to engage track surfaces on said guide means, said roller having annular flange portions provided thereon arranged for slidable keying engagement with said guide means to transmit drive from the back plate to said shaftable member.

5. A clutch as set forth in claim 1, including one or more projections on said shiftable member arranged for slidable keying engagement with said guide means to transmit drive from the back plate to the shiftable member.

6. A clutch as set forth in claim 1, including one or more projections on said shiftable member arranged for slidable keying engagement with said guide means to transmit drive from the back plate to the shiftable member, said projections constituting bearing supports for the roller means.

7. Actuating mechanism for a friction clutch, comprising a flywheel having a back plate, a clutch disk and, a pressure plate for frictionally engaging the clutch disk, said actuating mechanism comprising lever means oscillatably mounted on the back plate and connected with the pressure plate to move it in either direction a shiftable member adapted to reciprocate in substantially coaxial relation to the back plate, means on said shiftable member operatively associated with the lever means to oscillate the latter in either direction to actuate the clutch, and guide means on the back plate guidingly engaged by the last mentioned means to guide said shiftable member in coaxial relation to the back plate and assume the radial thrust on said shiftable member incident to the operation of the lever means thereby.

8. Actuating mechanism for a friction clutch comprising a flywheel having a back plate, a clutch disk and, a pressure plate for frictionally engaging the clutch disk, said actuating mechanism comprising lever means oscillatably mounted on the back plate and connected with the pressure plate to move it in either direction, a shiftable member adapted to reciprocate in substantially coaxial relation to the back plate, roller means on said shiftable member in transverse relation to the axis of rotation of the clutch having rolling contact with the lever means to oscillate the latter in either direction to actuate the clutch, and guide means on the back plate having track surfaces thereon for rolling guiding contact of said roller means thereon to guide said shiftable member in coaxial relation to the back plate and assume the radial thrust on said shiftable member incident to the operation of the lever means thereby.

9. A clutch as set forth in claim 8, wherein the roller means comprises an elongated roller, one portion of which is arranged to engage and operate said lever means, and another portion of which is arranged to engage a track surface on said guide means.

10. A clutch as set forth in claim 8, wherein said roller means comprises a plurality of rollers coaxially mounted for rotation, one of which is arranged for operative engagement with said lever means, and another of which is arranged for engagement with a track surface on said guide means.

11. A clutch as set forth in claim 8, wherein the roller means comprises an elongated roller, a middle portion of which is arranged to engage and operate said lever means, and the end portions of which are arranged to engage track surfaces on said guide means, said roller having annular flange portions provided thereon arranged for slidable keying engagement with said guide means to transmit drive from the back plate to said shiftable member.

12. A clutch as set forth in claim 8, including one or more projections on said shiftable member arranged for slidable keying engagement with said guide means to transmit drive from the back plate to the shiftable member.

13. A clutch as set forth in claim 8, including one or mode projections on said shiftable member arranged for slidable keying engagement with said guide means to transmit drive from the back plate to the shiftable member, said projections constituting bearing supports for the roller means.

14. In a clutch actuating mechanism, the combination with a back plate, a pressure plate actuating ring movable toward and away from the back plate, and clutch actuating lever means pivotally mounted on the back plate and arranged to transmit reciprocatory movement to said ring in the oscillatory movement of said lever means, of a throw-out member reciprocable toward and away from the back plate in substantially coaxial relation thereto, guide means on the back plate for said throw-out member, and a single means on said throw-out member to actuate said lever means and cooperate with the guide means to guide said throw-out member relative to the back plate.

15. In a clutch actuating mechanism, the combination with a back plate, a pressure plate actuating ring movable toward and away from the back plate, and clutch actuating lever means pivotally mounted on the back plate and arranged to transmit reciprocatory movement to said ring in the oscillatory movement of said lever means, of a tubular guide member extending from the center of the back plate, a throw-out sleeve having bearing contact in the rear portion thereof on said guide member, and means for reciprocating said throw-out sleeve including a throw-out collar rotatably mounted on the rear portion thereof, guide means on the back plate for the front end portion of the throw-out sleeve, and a single means on the front end portion of said throw-out sleeve to actuate said lever means and cooperate with the guide means to guide said throw-out sleeve relative to the back plate and also turn said throw-out sleeve therewith.

16. In a clutch actuating mechanism, the combination with a back plate, a pressure plate actuating ring movable toward and away from the back plate, and clutch actuating lever means pivotally mounted on the back plate and arranged to transmit reciprocatory movement to said ring in the oscillatory movement of said lever means, of a tubular guide member extending from the center of the back plate, a throw-out sleeve having bearing contact in the rear portion thereof on said guide member, and means for reciprocating said throw-out sleeve including a throw-out collar rotatably mounted on the rear portion thereof, guide means on the back plate for the front end portion of the throw-out sleeve, means on the front end portion of the throw-out sleeve for oscillating said lever means in the reciprocatory movement of said sleeve, means for supplying lubricant to the throw-out collar, and means including one or more openings in the rear end portion of said throw-out sleeve communicating with the throw-out collar, and one or more other openings in the front end portion of the throw-out sleeve in proximity to said guide means and lever actuating means for supplying lubricant to said means and to the outside of the tubular guide member from the interior of said throwout sleeve.

17. A clutch actuating mechanism as set forth in claim 16, wherein said throw-out sleeve has an annular pocket provided therein intermediate the ends thereof to retain a reserve supply of lubricant in the rotation of said sleeve in the operation of the clutch, the lubricant being thrown outwardly into and retained in said pocket under centrifugal force.

18. A clutch actuating mechanism as set forth in claim 16, wherein said throw-out sleeve has an annular pocket provided therein intermediate the ends thereof to retain a reserve supply of lubricant in the rotation of said sleeve in the operation of the clutch, the lubricant being thrown outwardly into and retained in said pocket under centrifugal force, and said throw-out sleeve having an annular groove provided in the front end portion thereof adapted to receive lubricant by overflow from said pocket when the throw-out sleeve is stationary, said groove having the one or more openings in the front end portion of the sleeve communicating therewith, whereby lubricant is discharged under centrifugal force from said groove through said openings in the rotation of said throw-out sleeve.

19. In a friction clutch, the combination with a flywheel having a back plate, a clutch disk, and a pressure plate for frictionally engaging the clutch disk, of a ring disposed behind the back plate and fixed to the pressure plate to turn therewith, a pair of rings disposed on opposite sides of said first ring and adapted to have limited axial movement with respect thereto, a spring caging ring, a plurality of bolts connecting the caging ring with one of the aforesaid pair of rings and extending loosely through registering openings in the aforesaid rings, a plurality of coiled compression springs surrounding said bolts between the caging ring and the other of the aforesaid pair of rings, guide pins on each of said pair of rings slidably received in guide holes provided therefor in the first mentioned ring to guide the pair of rings thereon for axial movement with respect thereto independently of said bolts, and positive acting means extending between said pair of rings to move the pressure plate and transmit spring pressure thereto to engage the clutch resiliently.

20. A clutch as set forth in claim 19, wherein the guide holes in the first mentioned ring are chamfered, substantially as and for the purpose described.

21. In a friction clutch, the combination with a flywheel having a back plate, a clutch disk, and a pressure plate for frictionally engaging the clutch disk, of a ring disposed behind the back plate and fixed to the pressure plate to turn therewith, a pair of sheet metal rings disposed on opposite sides of said first ring and guided for limited axial movement with respect thereto, springs caged on said pair of rings in compressed condition and adapted to be further compressed when said rings are forced apart, one or more levers pivotally mounted on the back plate and each having an arm extending substantially radially relative to and between said pair of rings to transmit pressure to one ring and move it relative to the other in the engagement of the clutch, hard wear-resisting pad portions applied to the inner faces of said pair of rings for cooperation with said arms, and means for oscillating said levers.

W. VINCENT THELANDER.
EVERSON M. DE COURSEY.
WILLIAM O. BECHMAN.
WILLIAM W. HENNING.